(12) United States Patent
Keegan et al.

(10) Patent No.: US 6,709,782 B2
(45) Date of Patent: Mar. 23, 2004

(54) FUEL CELL HAVING AN ANODE PROTECTED FROM HIGH OXYGEN ION CONCENTRATION

(75) Inventors: Kevin R. Keegan, Hilton, NY (US); Bernie Fischer, Rochester, NY (US); Diane M. England, Bloomfield, NY (US)

(73) Assignee: Delphi Technologies, Inc., Troy, MI (US)

( * ) Notice: Subject to any disclaimer, the term of this patent is extended or adjusted under 35 U.S.C. 154(b) by 145 days.

(21) Appl. No.: 09/968,419

(22) Filed: Oct. 1, 2001

(65) Prior Publication Data
US 2003/0064264 A1 Apr. 3, 2003

(51) Int. Cl.⁷ .................................. H01M 2/14
(52) U.S. Cl. ...................... 429/38; 429/39; 429/30; 429/31; 429/32
(58) Field of Search ................. 429/13, 17, 30, 429/31, 32, 34, 38, 39

(56) References Cited

U.S. PATENT DOCUMENTS

| | | | | |
|---|---|---|---|---|
| 5,532,071 A | * | 7/1996 | Pal et al. | 429/12 |
| 5,820,654 A | * | 10/1998 | Gottzman et al. | 95/54 |
| 6,015,633 A | * | 1/2000 | Carlstrom, Jr. et al. | 429/13 |
| 6,093,502 A | * | 7/2000 | Carlstrom, Jr. et al. | 429/25 |
| 6,230,494 B1 | | 5/2001 | Botti et al. | 60/649 |
| 6,280,869 B1 | * | 8/2001 | Chen | 429/34 |
| 6,423,896 B1 | | 7/2002 | Keegan | 136/253 |
| 6,444,340 B1 | * | 9/2002 | Jaffrey | 429/30 |
| 6,485,852 B1 | | 11/2002 | Miller et al. | 429/17 |
| 6,500,574 B2 | | 12/2002 | Keegan | 429/23 |
| 6,509,113 B2 | | 1/2003 | Keegan | 429/30 |
| 6,551,734 B1 | | 4/2003 | Simpkins et al. | 429/260 |
| 6,562,496 B2 | * | 5/2003 | Faville et al. | 429/13 |
| 6,572,996 B1 | * | 6/2003 | Isenberg et al. | 429/31 |
| 6,608,463 B1 | | 8/2003 | Kelly et al. | 320/101 |
| 6,609,582 B1 | | 8/2003 | Botti et al. | 180/65.3 |
| 6,613,468 B2 | | 9/2003 | Simpkins et al. | 429/34 |
| 6,613,469 B2 | | 9/2003 | Keegan | 429/34 |
| 6,620,535 B2 | | 9/2003 | Mukerjee et al. | 429/13 |

* cited by examiner

Primary Examiner—Bruce F. Bell
(74) Attorney, Agent, or Firm—Jimmy L. Funke

(57) ABSTRACT

A fuel cell having an optimized flow space for the passage of hydrogen gas across the surface of an anode. The invention prevents destructive oxidation of the anode by preventing the buildup of locally high levels of oxygen. The anode surface itself may be shaped in lateral plan to follow the natural contours of gas flow to eliminate hydrogen stagnation areas on the anode surface. Alternatively, the anode surface or the cathode surface may be coated in regions of anode stagnation to prevent the fuel cell reactions from occurring in those regions. Alternatively, the gas seals may be formed to cover the anode surface in stagnation regions. Alternatively, the cathode and/or electrolyte may be shaped or thickened to reduce or prevent diffusion of oxygen ions therethrough.

10 Claims, 5 Drawing Sheets

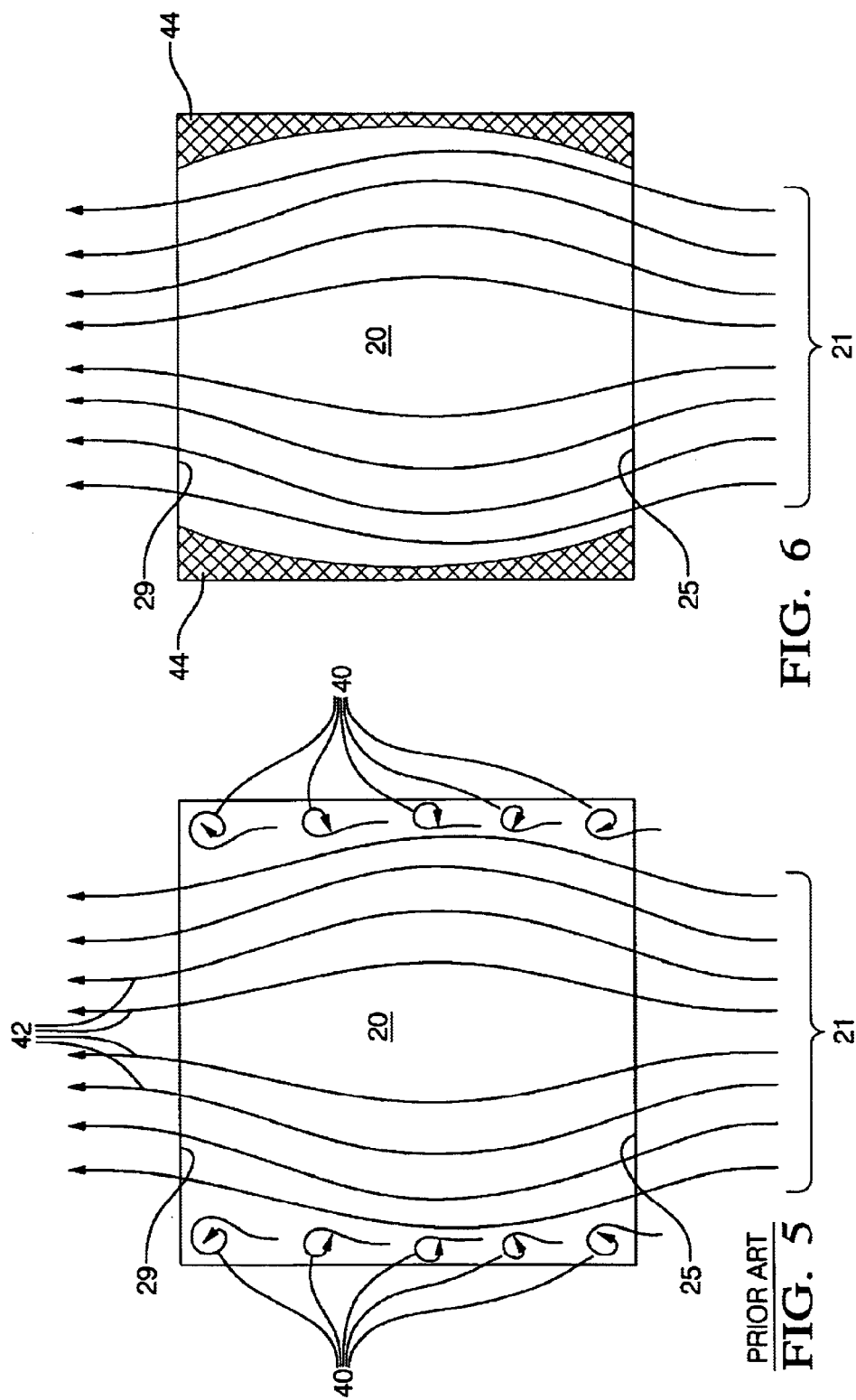

FUEL CELL HAVING AN ANODE PROTECTED FROM HIGH OXYGEN ION CONCENTRATION

TECHNICAL FIELD

The present invention relates to fuel cells; more particularly, to such fuel cells having a solid oxide electrolyte; and most particularly, to such a fuel cell wherein the permeation of oxygen ion to regions of the anode having localized low hydrogen concentration is controlled to prevent localized areas of high oxygen ion concentration which can cause corrosion and failure of the anode.

BACKGROUND OF THE INVENTION

Fuel cells which generate electric current by controllably combining elemental hydrogen and oxygen are well known. In one form of such a fuel cell, an anodic layer and a cathodic layer are separated by a permeable electrolyte formed of a ceramic solid oxide. Such a fuel cell is known in the art as a "solid oxide fuel cell" (SOFC). Either pure hydrogen or reformate is flowed along the outer surface of the anode and diffuses into the anode. Oxygen, typically from air, is flowed along the outer surface of the cathode and diffuses into the cathode. Each $O_2$ molecule is split and reduced to two $O^{-2}$ ions at the cathode/electrolyte interface. The oxygen ions diffuse through the electrolyte and combine at the anode/electrolyte interface with four hydrogen ions to form two molecules of water. The anode and the cathode are connected externally through the load to complete the circuit whereby four electrons are transferred from the anode to the cathode. When hydrogen is derived from "reformed" hydrocarbons, the "reformate" gas includes CO which is also converted to $CO_2$ at the anode/electrolyte interface.

A single cell is capable of generating a relatively small voltage and wattage, typically about 0.7 volts and less than about 2 watts per $cm^2$ of active area. Therefore, in practice it is usual to stack together in electrical series a plurality of cells. Because each anode and cathode must have a free space for passage of gas over its surface, the cells are separated by perimeter spacers which are vented to permit flow of gas to the anodes and cathodes as desired but which form seals on their axial surfaces to prevent gas leakage from the sides of the stack. Adjacent cells are connected electrically by "interconnect" elements in the stack, and the outer surfaces of the anodes and cathodes are electrically connected to their respective interconnects by electrical contacts disposed within the gas-flow space, typically by a metallic foam or a metallic mesh which is readily gas-permeable or by conductive filaments. The outermost, or end, interconnects of the stack define electrical terminals, or "current collectors," connected across a load.

For electrochemical reasons well known to those skilled in the art, an SOFC requires an elevated operating temperature, typically 750° C. or greater.

For steric reasons, fuel cells may be rectangular in plan view. Typically, gas flows into and out of the cells through a vertical manifold formed by aligned perforations near the edges of the components, the hydrogen flowing from its inlet manifold to its outlet manifold across the anodes in a first direction, and the oxygen flowing from its inlet manifold to its outlet manifold across the cathodes in a second direction. Thus, fuel cells are typically square in horizontal plan, and the anodes and cathodes have square corners.

A serious problem can arise in operation of a fuel cell formed as just described. The anode typically includes a relatively active metal such as nickel (Ni). In a cell having a square hydrogen flow path, the corners and sides of the square may be stagnant areas in which hydrogen is not readily replenished, allowing the partial pressure of $O^{-2}$ to build up in the anode and at the anode/electrolyte interface. $O^{-2}$ which is not scavenged immediately by hydrogen or CO can attack and oxidize nickel in the anode. The mismatch in thermal expansion coefficient between Ni and NiO causes volume changes which can lead to stress and eventual cracking and failure of the cell.

What is needed is a means for preventing the formation of local areas of high oxygen ion concentration at the anode to protect the anode from corrosive attack.

It is a principal object of the present invention to prevent formation of a locally corrosive concentration of $O^{-2}$ at the anode of a solid oxide fuel cell.

It is a further object of the invention to increase the uniformity of gas distribution over the surface of an anode in a solid oxide fuel cell.

SUMMARY OF THE INVENTION

Briefly described, a fuel cell in accordance with the invention has a flow space for the passage of hydrogen gas across the surface of an anode. In the prior art, hydrogen gas may eddy and stagnate in corners or along edges of the flow space, resulting in locally low levels of hydrogen and correspondingly permitting locally high levels of oxygen ion in the anode, which can cause undesirable destructive oxidation of the anode. The invention prevents such destructive oxidation by preventing the buildup of such locally high levels of oxygen ion.

In a first embodiment of the invention, the anode surface itself is shaped in lateral plan to follow the natural contours of gas flow through the space and to eliminate corners or other areas on the anode surface on which gas may eddy and stagnate. Thus, no combustion reaction is possible in these regions of the anode, and oxygen ion therefore is not drawn to these regions.

In a second embodiment, the sidewall of the flow space is shaped by configuring the aperture in the spacer which defines the sidewall of the flow space in such a way that the spacer occludes the otherwise stagnant areas of the rectangular anode, preventing hydrogen from reaching the anode surface in these regions.

In a third embodiment, the anode surface on which gas may eddy and stagnate is dielectric coated in the regions of eddying and stagnation to prevent the migration of hydrogen into the anode.

In a fourth embodiment, the cathode surface corresponding to the anode regions of eddying and stagnation is eliminated to prevent the migration of oxygen ion to the anode in those regions.

In a fifth embodiment, the cathode surface corresponding to the anode regions of eddying and stagnation is much thicker than in cathode regions corresponding to the laminar flow regions of the anode to reduce the migration of oxygen ion to the anode in the stagnation regions.

BRIEF DESCRIPTION OF THE DRAWINGS

These and other features and advantages of the invention will be more fully understood and appreciated from the following description of certain exemplary embodiments of the invention taken together with the accompanying drawings, in which:

FIG. 5 is a schematic plan view of a prior art anode surface in a solid oxide fuel cell, showing flow eddying and stagnation along the flow boundaries and at the corners of the anode surface; and FIG. 6 is a view like that shown in FIG. 5, showing an anode surface in accordance with the invention in which high oxygen ion concentrations in the anode are prevented.

DESCRIPTION OF THE PREFERRED EMBODIMENTS

Figure 1:
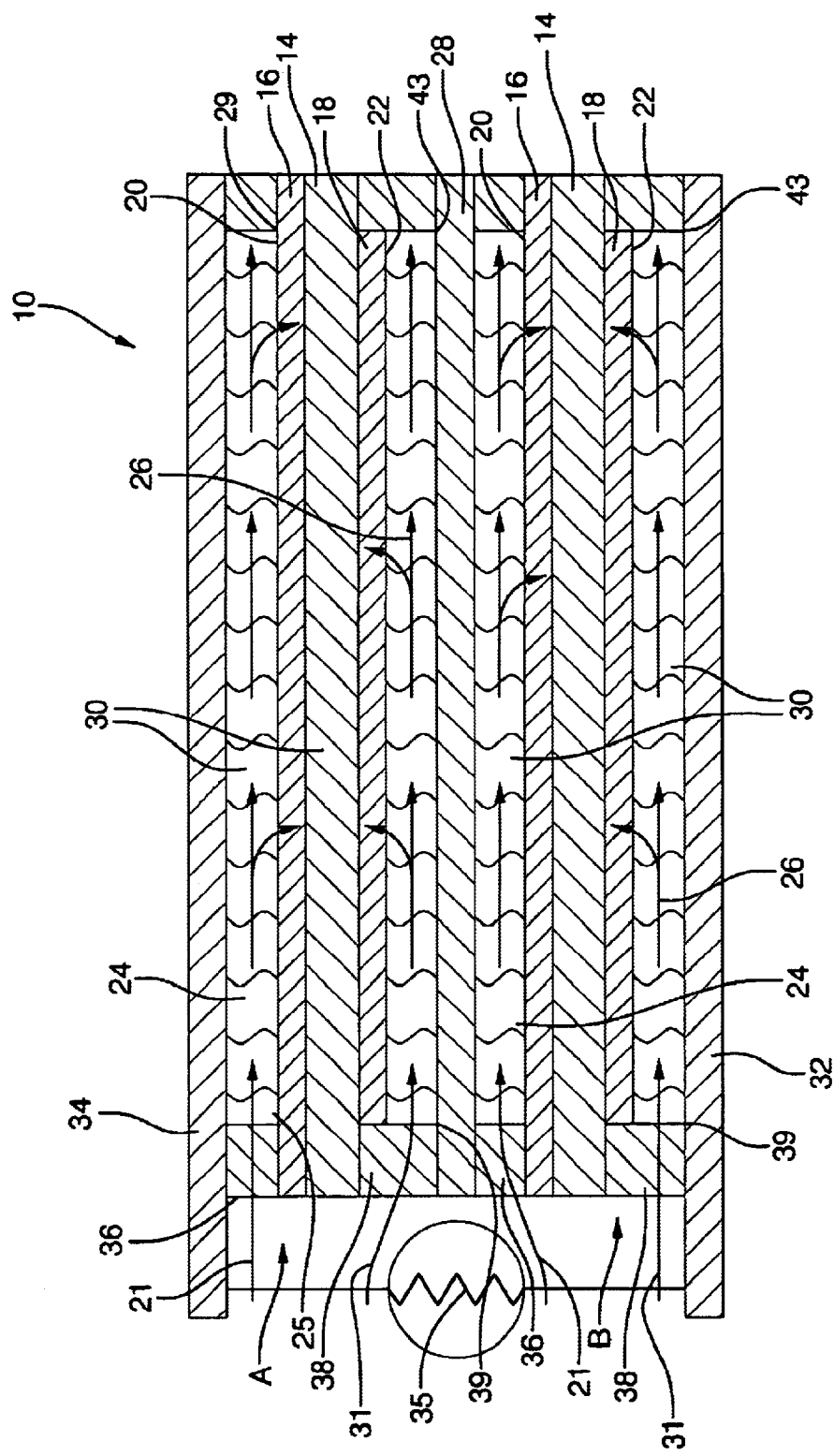
FIG. 1 is a schematic cross-sectional view of a two-cell stack of solid oxide fuel cells in accordance with the invention.

Referring to FIG. 1, a fuel cell stack 10 includes elements normal in the art to solid oxide fuel cell stacks comprising more than one fuel cell. The example shown includes two fuel cells A and B, connected in series, and is of a class of such fuel cells said to be "anode-supported" in that the anode is a structural element having the electrolyte and cathode deposited upon it. Element thicknesses as shown are not to scale.

Each fuel cell includes an electrolyte element 14 separating an anodic element 16 and a cathodic element 18. Each anode and cathode is in direct chemical contact with its respective surface of the electrolyte, and each anode and cathode has a respective free surface 20,22 forming one wall of a respective passageway 24,26 for flow of gas across the surface. Anode 16 of fuel cell B faces and is electrically connected to an interconnect 28 by filaments 30 extending across but not blocking passageway 24. Similarly, cathode 18 of fuel cell A faces and is electrically connected to interconnect 28 by filaments 30 extending across but not blocking passageway 26. Similarly, cathode 18 of fuel cell B faces and is electrically connected to a cathodic current collector 32 by filaments 30 extending across but not blocking passageway 26, and anode 16 of fuel cell A faces and is electrically connected to an anodic current collector 34 by filaments 30 extending across but not blocking passageway 24. Current collectors 32,34 may be connected across a load 35 in order that the fuel cell stack 10 performs electrical work. Passageways 24 are formed by anode spacers 36 between the perimeter of anode 16 and either interconnect 28 or anodic current collector 34. Passageways 26 are formed by cathode spacers 38 between the perimeter of electrolyte 14 and either interconnect 28 or cathodic current collector 32. Spacers 36,38 also serve to seal the perimeter of the stack against gas leakage and may be augmented by seals 37 (FIG. 2) specifically formulated for sealing against the surface of electrolyte 14; for example, compressed phlogopite mica can form an excellent gas seal.

Figure 2:
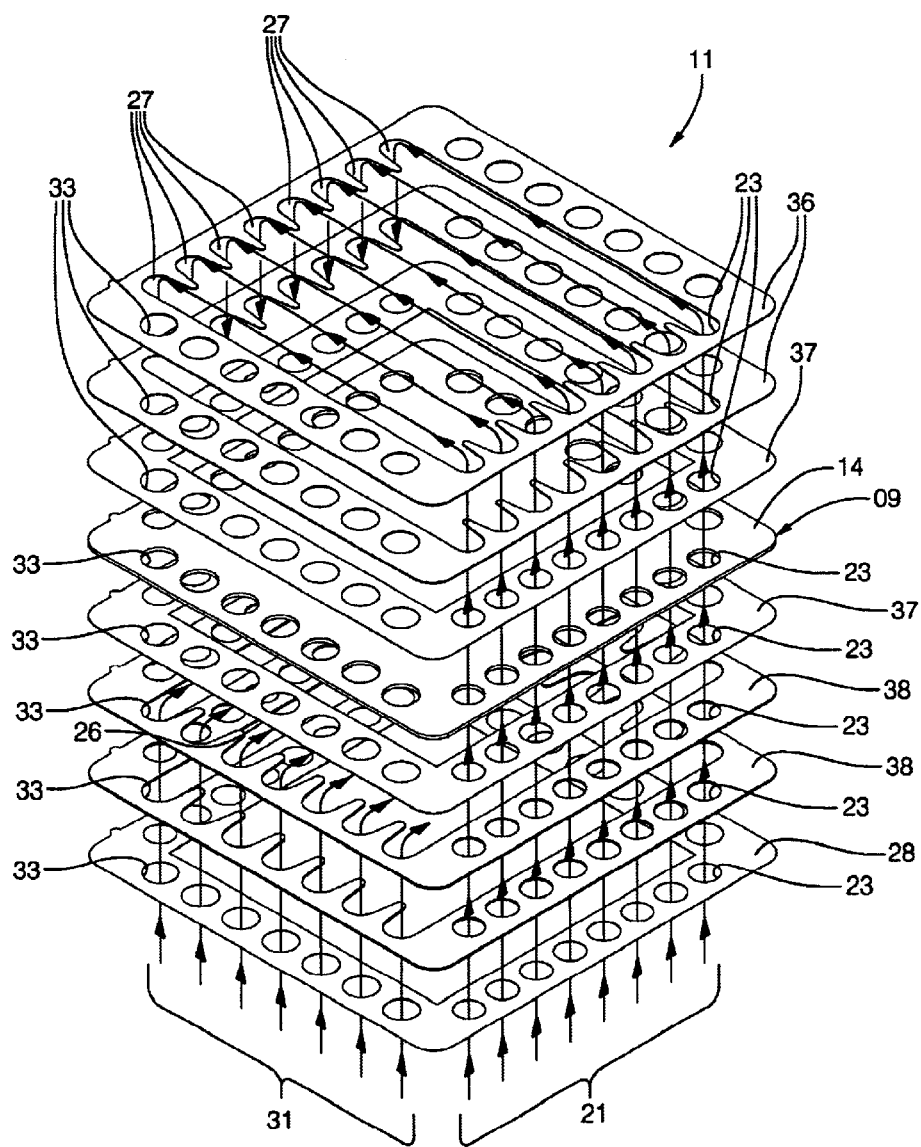
FIG. 2 is an exploded isometric view of a single solid oxide fuel cell, showing the various elements.
Figure 3:
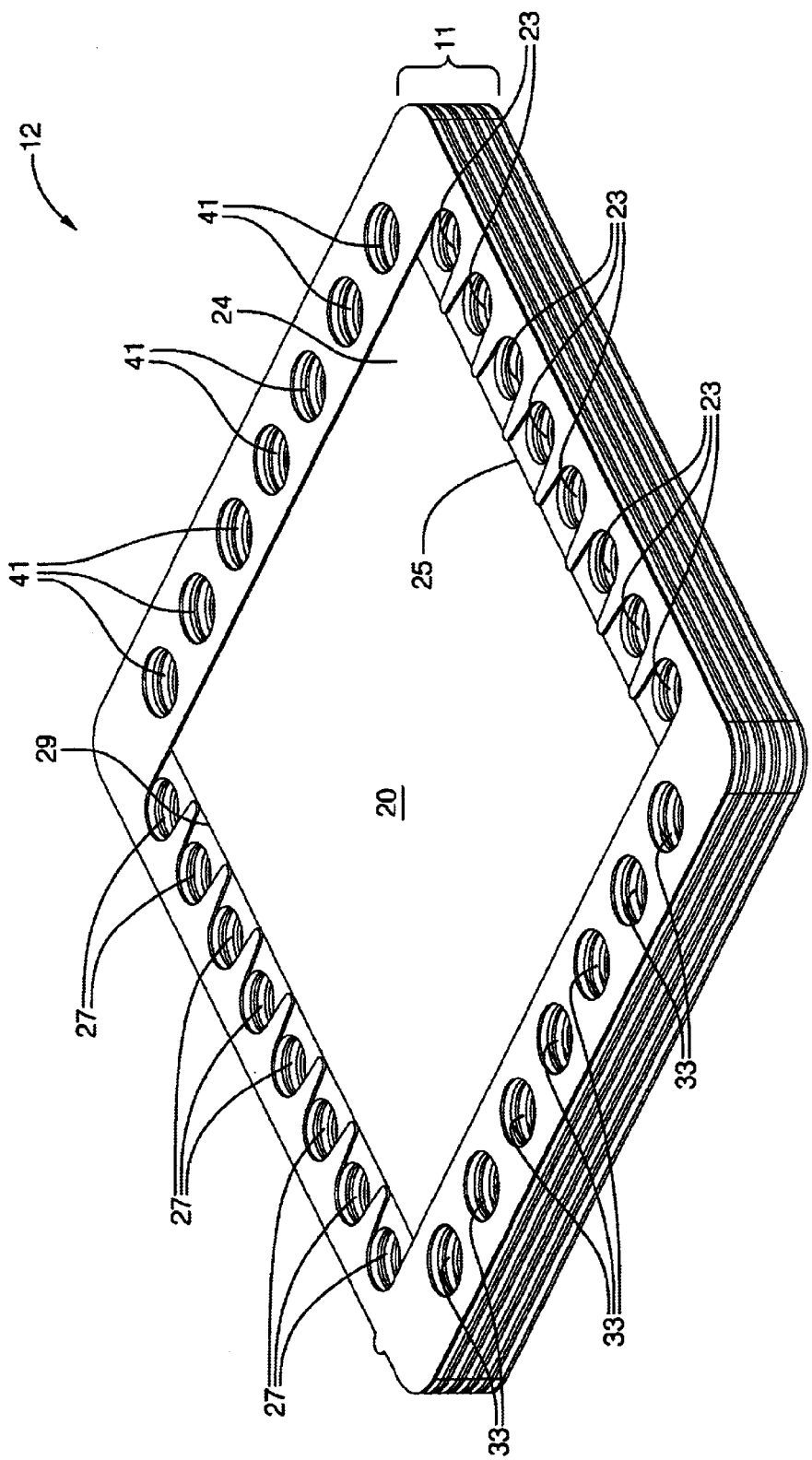
FIG. 3 is an isometric view of a fuel-cell stack comprising five cells like the cell shown in FIG. 2.
Figure 4:
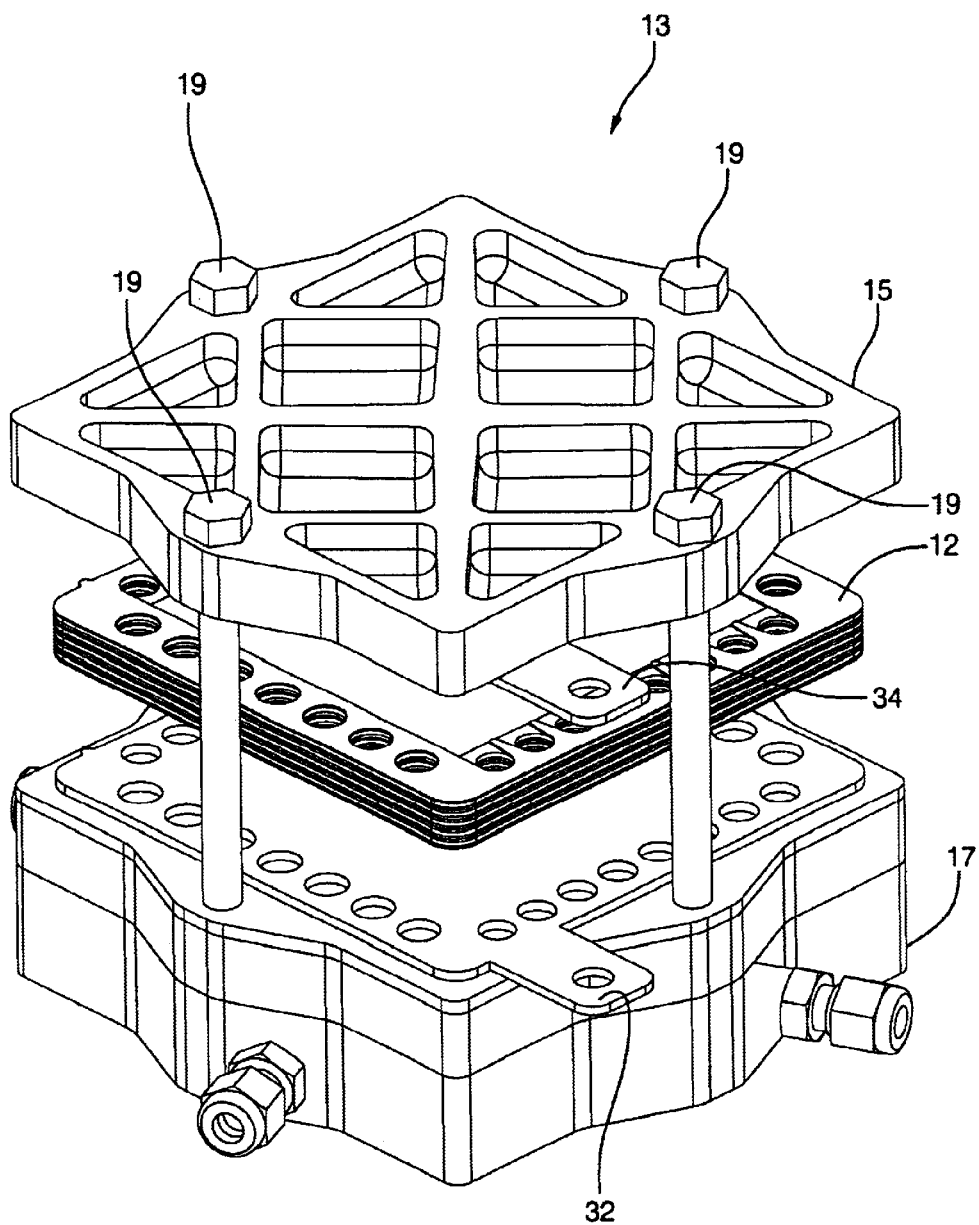
FIG. 4 is an isometric view like that shown in FIG. 3, partially exploded, showing the addition of current collectors, end plates, and bolts to form a complete fuel cell stack ready for use.

Referring to FIGS. 2 through 4, a plurality of individual fuel cells 11 may be stacked together to form a stack 12 (FIGS. 3 and 4) similar to schematic stack 10 shown in FIG. 1. Stack 12 comprises five such cells. To form a complete working fuel cell assembly 13 (FIG. 4), stack 12 is sandwiched between an anodic current collector 34 and a cathodic current collector 32 which in turn are sandwiched between a top plate 15 and a gas-manifold base 17, the entire assembly being sealingly bound together by bolts 19 extending through bores in top plate 15 and threadedly received in bores in base 17.

Preferably, the interconnect and the current collectors are formed of an alloy which is chemically and dimensionally stable at the elevated temperatures necessary for fuel cell operation, generally about 750° C. or higher, for example, Hastalloy, Haines 230, or a stainless steel. The electrolyte is formed of a ceramic oxide and preferably includes zirconia stabilized with yttrium oxide (yttria), known in the art as YSZ. The cathode is formed of, for example, porous lanthanum strontium manganate or lanthanum strontium iron, and the anode is formed, for example, of a mixture of nickel and YSZ.

Referring to FIGS. 1, 2, and 5, in operation, hydrogen or reformate gas 21 is provided via supply conduits 23 to passageways 24 at a first edge 25 of the anode free surface 20, flows parallel to the surface of the anode across the anode in a first direction, and is removed via exhaust conduits 27 at a second and opposite edge 29 of anode surface 20. Hydrogen (and CO if the fuel gas is reformate) also diffuses into the anode to the interface with the electrolyte. Oxygen 31, typically in air, is provided via supply conduits 33 to passageways 26 at a first edge 39 of the cathode free surface 22, flows parallel to the surface of the cathode in a second direction orthogonal to the first direction of the hydrogen, and is removed via exhaust conduits 41 at a second and opposite edge 43 of cathode surface 22. Molecular oxygen gas ($O_2$) diffuses into the cathode and is catalytically reduced to two $O^{-2}$ ions by accepting four electrons from the cathode and the cathodic current collector 32 (cell B) or the interconnect 28 (cell A) via filaments 30. The electrolyte is permeable to the $O^{-2}$ ions which pass through the electrolyte and combine with four hydrogen atoms to form two water molecules, giving up four electrons to the anode and the anodic current collector 34 (cell A) or the interconnect 28 (cell B) via filaments 30. Thus cells A and B are connected in series electrically between the two current collectors, and the total voltage and wattage between the current collectors is the sum of the voltage and wattage of the individual cells in a fuel cell stack.

FIG. 5 illustrates schematically a practical problem that is well known in the construction and operation of rectangular fuel cell stacks such as stack 12. The cathode side of a fuel cell typically is flooded with an excess of oxygen in the form of air. However, on the anode side reformate fuel gas is metered across the electrode surface at a relatively low rate of flow, ideally but not practically at a flow rate sufficiently low that all the fuel is consumed by the cell and none is passed through. At such low flow rates, as shown in FIG. 5, eddying and stagnation 40 of the fuel gas flow 42 can occur along the sides and at the corners of the rectangular anode surface 20. This is especially undesirable because in these areas there is relatively low partial pressure of hydrogen, as hydrogen is consumed in the anode faster than it can be replaced. The result is that an undesirably high partial pressure of $O^{-2}$ can arise in the anode in these areas, resulting in oxidation of anode nickel which can lead to structural failure of the cell. Such oxidation does not occur in anode regions having a hydrogen supply sufficient to scavenge $O^{-2}$ ions as they emerge from the electrolyte.

Known approaches to remedying this problem involve either using pressure gradients to cause the flow to be more uniform and/or providing aerodynamically improved entry and exit manifolding to expand and contract the flow smoothly. The former approach is undesirable because it results in reduced system efficiency due to pressure increase in the fuel flow, and the latter approach is undesirable because it requires very substantial increase in the size and shape of the stack to accommodate the smoothing manifolds.

The problem may be remedied in accordance with the present invention, as shown in FIG. 6, by any of a number of physical and/or chemical configurations as described below, all of which act to prevent the buildup of unacceptably high $O^{-2}$ ion concentrations in the areas 44 of the anode surface wherein hydrogen eddying and stagnation may or does occur, as shown in FIG. 5.

In a first embodiment, anode 16 may be shaped physically in plan view by known techniques during manufacture of the cell to match the substantially laminar portion of the fuel gas flow. Areas 44 represent regions where no anode material exists; thus, no nickel corrosion can occur.

In a second embodiment, a square anode 16 may be covered by a dielectric sealing material, for example, YSZ, deposited by known techniques in areas 44, thus making the anode non-conductive in those areas as well as inhibiting the permeation of $H_2$ and $O^{-2}$.

In a third embodiment, the central aperture in seal 37 may be formed in the shape of the anode surface in FIG. 6 such that the electrolyte is sealed on either the anode side or the cathode side against permeation by $O^{-2}$ over a region identical to area 44 in the anode; in other words, a seal "mask." Seal 37 on either or both sides of electrolyte 14 may be thus modified.

In a fourth embodiment, either or both of electrolyte 14 and cathode 18 may be formed to match the shape of the laminar flow anode surface in FIG. 6, the actual anode surface being rectangular; thus permeation of $O^{-2}$ ions into areas 44 of the anode is not possible.

In a fifth embodiment, the cathode may be formed with significantly increased thickness in areas corresponding to areas 44 in the anode, thus increasing the length of the diffusion path and decreasing the rate of permeability of the cathode to oxygen ions in those areas.

Techniques for forming the anode, electrolyte, cathode, spacers, and seals in the configurations just recited are well within the skill of one skilled in the art of fuel cell manufacture; therefore, such techniques need not be recited here.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A fuel cell for generating an electric current, comprising:
   a) an anode for reacting hydrogen ions with oxygen ions, said hydrogen ions being derived from gaseous molecular hydrogen flowing in a first flow path through a first portion of said cell with oxygen ions;
   b) a cathode for providing said oxygen ions derived from gaseous molecular oxygen flowing in a second flow path through a second portion of said cell; and
   c) a solid oxide electrolyte separating said anode from said cathode,
      wherein said first flow path of said hydrogen molecules is shaped to prevent eddying and stagnation of hydrogen gas in regions along the surface of said anode and thereby to prevent a high concentration of oxygen ion in said stagnant regions.

2. A fuel cell in accordance with claim 1 wherein said cell includes a perimeter spacer for cooperating with said anode surface to define said first portion of said cell, and wherein said shaping of said first flow path includes the occupying by portions of said spacer of those regions of said first flow path wherein said eddying and stagnation would otherwise occur.

3. A fuel cell in accordance with claim 1 wherein said anode surface is shaped to eliminate said anode in regions of said first flow path wherein said eddying and stagnation may occur.

4. A fuel cell for generating an electric current, comprising:
   a) an anode for reacting hydrogen ions with oxygen ions, said hydrogen ions being derived from gaseous molecular hydrogen flowing in a first flow path through a first portion of said cell with oxygen ions;
   b) a cathode for providing said oxygen ions derived from gaseous molecular oxygen flowing in a second flow path through a second portion of said cell; and
   c) a solid oxide electrolyte separating said anode from said cathode,
      wherein said anode is shielded in regions of eddying and stagnation of hydrogen gas along said first flow path of said hydrogen molecules to prevent degradation of said anode by reaction with oxygen ions.

5. A fuel cell in accordance with claim 4 wherein said shielding comprises a non-conductive layer on said anode in said regions of eddying and stagnation.

6. A fuel cell for generating an electric current, comprising:
   a) an anode for reacting hydrogen ions with oxygen ions, said hydrogen ions being derived from gaseous molecular hydrogen flowing in a first flow path through a first portion of said cell with oxygen ions;
   b) a cathode for providing said oxygen ions derived from gaseous molecular oxygen flowing in a second flow path through a second portion of said cell; and
   c) a solid oxide electrolyte separating said anode from said cathode,
      wherein said cathode is shielded in regions corresponding to said anode regions of eddying and stagnation of hydrogen gas along said anode surface to prevent degradation of said anode by reaction with oxygen ions in said anode regions.

7. A fuel cell in accordance with claim 6 wherein said cathode shielding comprises a non-conductive layer on said cathode.

8. A fuel cell for generating an electric current, comprising:
   a) an anode for reacting hydrogen ions with oxygen ions, said hydrogen ions being derived from gaseous molecular hydrogen flowing in a first flow path through a first portion of said cell with oxygen ions;
   b) a cathode for providing said oxygen ions derived from gaseous molecular oxygen flowing in a second flow path through a second portion of said cell; and
   c) a solid oxide electrolyte separating said anode from said cathode,
      wherein at least one of said solid oxide electrolyte and said cathode is shaped in plan view to prevent diffusion of oxygen ions through said electrolyte to regions of said anode wherein eddying and stagnation of hydrogen gas may occur to prevent concomitant degradation in said stagnation regions of said anode by reaction with oxygen ions.

9. An automotive vehicle including a fuel cell for generating an electric current, wherein said fuel cell comprises:
   a) an anode for reacting hydrogen ions with oxygen ions, said hydrogen ions being derived from gaseous molecular hydrogen flowing in a first flow path through a first portion of said cell with oxygen ions;

b) a cathode for providing said oxygen ions derived from gaseous molecular oxygen flowing in a second flow path through a second portion of said cell; and c) a solid oxide electrolyte separating said anode from said cathode, wherein said first flow path of said hydrogen molecules is shaped to prevent eddying and stagnation of hydrogen gas in regions along the surface of said anode and thereby to prevent a high concentration of oxygen ion in said stagnant regions.

10. A fuel cell for generating an electric current, comprising:

a) an anode for reacting hydrogen ions with oxygen ions, said hydrogen ions being derived from gaseous molecular hydrogen flowing in a first flow path through a first portion of said cell with oxygen ions;

b) a cathode for providing said oxygen ions derived from gaseous molecular oxygen flowing in a second flow path through a second portion of said cell; and c) a solid oxide electrolyte separating said anode from said cathode, wherein said cathode is thicker in regions corresponding to anode regions of eddying and stagnation of hydrogen gas than in regions of laminar flow of hydrogen gas to reduce the rate of diffusion of oxygen ions through said cathode in said thicker regions and thereby prevent degradation of said anode by reaction with oxygen ions in said corresponding anode regions.

* * * * *